US011881153B2

(12) United States Patent
Park

(10) Patent No.: US 11,881,153 B2
(45) Date of Patent: Jan. 23, 2024

(54) PANEL DRIVING DEVICE, DRIVING METHOD THEREOF, AND ELECTROLUMINESCENT DISPLAY APPARATUS

(71) Applicant: LG Display Co., Ltd., Seoul (KR)

(72) Inventor: Joon Min Park, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/980,508

(22) Filed: Nov. 3, 2022

(65) Prior Publication Data

US 2023/0206826 A1 Jun. 29, 2023

(30) Foreign Application Priority Data

Dec. 23, 2021 (KR) ........................ 10-2021-0185667

(51) Int. Cl.
*G09G 3/32* (2016.01)

(52) U.S. Cl.
CPC ......... *G09G 3/32* (2013.01); *G09G 2310/027* (2013.01); *G09G 2310/0278* (2013.01); *G09G 2310/061* (2013.01); *G09G 2320/0233* (2013.01)

(58) Field of Classification Search
CPC ............. G09G 3/32; G09G 2310/0278; G09G 2320/0233; G09G 2310/027; G09G 2310/061
See application file for complete search history.

(56) References Cited

U.S. PATENT DOCUMENTS

| | | | | |
|---|---|---|---|---|
| 2020/0074932 | A1* | 3/2020 | Park | G09G 3/3291 |
| 2020/0380906 | A1* | 12/2020 | Kim | G09G 3/3258 |
| 2021/0005145 | A1* | 1/2021 | Lee | G09G 3/3291 |
| 2021/0193028 | A1* | 6/2021 | Choi | G09G 3/32 |
| 2023/0101274 | A1 | 3/2023 | Lee et al. | |

OTHER PUBLICATIONS

Combined Search and Examination Report issued in GB application 2216086.5 dated Apr. 26, 2023.

* cited by examiner

*Primary Examiner* — Muhammad N Edun
(74) *Attorney, Agent, or Firm* — Morgan, Lewis & Bockius LLP

(57) ABSTRACT

An electroluminescent display apparatus includes a display panel including first and second pixel, a data voltage supply unit supplying the first pixel with a first data voltage of a first gate signal and supplying the second pixel with a second data voltage of a second gate signal in a vertical active period of a first frame and continuously supplying the second pixel with a sensing data voltage and a recovery data voltage of a third gate signal in a vertical blank period of the first frame, and a sensing circuit sensing an electrical characteristic of the second pixel based on the sensing data voltage in the vertical blank period. The recovery data voltage is supplied to the second pixel later than the sensing data voltage. The recovery data voltage supplied to the second pixel in the vertical blank period includes the first and second data voltages.

17 Claims, 9 Drawing Sheets

PANEL DRIVING DEVICE, DRIVING METHOD THEREOF, AND ELECTROLUMINESCENT DISPLAY APPARATUS

CROSS-REFERENCE TO RELATED APPLICATIONS

This application claims priority from the Korean Patent Application No. 10-2021-0185667 filed on Dec. 23, 2021.

BACKGROUND

Technical Field

The present disclosure relates to a panel driving device, a driving method thereof, and an electroluminescent display apparatus.

Discussion of the Related Art

Each pixel of an electroluminescent display apparatus includes a light emitting device emitting (e.g. self-emitting) light and controls the amount of light emitted from the light emitting device with a data voltage based on a gray level of image data to adjust luminance.

Electroluminescent display apparatuses use external compensation technology for increasing image quality. The external compensation technology senses, by pixel row units, a pixel voltage or current based on an electrical characteristic of a pixel, and modulates data of an input image on the basis of a sensed result, thereby compensating for an electrical characteristic deviation between pixels.

However, in electroluminescent display apparatuses of the related art, there is a problem where a luminance deviation occurs between a sensed pixel row and a non-sensed pixel row.

SUMMARY

Accordingly, embodiments of the present disclosure are directed to a panel driving device, a driving method thereof, and an electroluminescent display apparatus that substantially obviates one or more of the problems due to limitations and disadvantages of the related art.

An aspect of the present disclosure is to provide a panel driving device, a driving method thereof, and an electroluminescent display apparatus, which decreases a luminance deviation occurring between a sensed pixel row and a non-sensed pixel row.

To achieve these objects and other aspects of the inventive concepts, as embodied and broadly described herein, an electroluminescent display apparatus comprises a display panel including a first pixel and a second pixel, a data voltage supply unit supplying the first pixel with a first data voltage corresponding to a first gate signal and supplying the second pixel with a second data voltage corresponding to a second gate signal in a vertical active period of a first frame and continuously supplying the second pixel with a sensing data voltage and a recovery data voltage corresponding to a third gate signal in a vertical blank period of the first frame, and a sensing circuit sensing an electrical characteristic of the second pixel on the basis of the sensing data voltage in the vertical blank period, wherein the recovery data voltage is supplied to the second pixel later than the sensing data voltage in the vertical blank period, and the recovery data voltage supplied to the second pixel in the vertical blank period includes the first data voltage and the second data voltage.

In another aspect, a panel driving device comprises a data voltage supply unit supplying a first pixel of a display panel with a first data voltage corresponding to a first gate signal and supplying a second pixel of the display panel with a second data voltage corresponding to a second gate signal in a vertical active period of a first frame and continuously supplying the second pixel with a sensing data voltage and a recovery data voltage corresponding to a third gate signal in a vertical blank period of the first frame and a sensing circuit sensing an electrical characteristic of the second pixel on the basis of the sensing data voltage in the vertical blank period, wherein the recovery data voltage is supplied to the second pixel later than the sensing data voltage in an on period of the third gate signal included in the vertical blank period, and the recovery data voltage supplied to the second pixel in the vertical blank period includes the first data voltage and the second data voltage.

In another aspect, a panel driving method comprises supplying a first pixel of a display panel with a first data voltage corresponding to a first gate signal and supplying a second pixel of the display panel with a second data voltage corresponding to a second gate signal in a vertical active period of a first frame, supplying the second pixel with a sensing data voltage corresponding to a third gate signal in a vertical blank period of the first frame and sensing an electrical characteristic of the second pixel on the basis of the sensing data voltage, and supplying the second pixel with a recovery data voltage corresponding to a third gate signal in a vertical blank period of the first frame, wherein the recovery data voltage is supplied to the second pixel later than the sensing data voltage in an on period of the third gate signal included in the vertical blank period, and the recovery data voltage supplied to the second pixel in the vertical blank period includes the first data voltage and the second data voltage.

It is to be understood that both the foregoing general description and the following detailed description are exemplary and explanatory and are intended to provide further explanation of the inventive concepts as claimed

BRIEF DESCRIPTION OF THE DRAWINGS

The accompanying drawings, which are included to: provide a further understanding of the disclosure and are incorporated in and constitute a part of this application; illustrate embodiments of the disclosure; and together with the description, serve to explain principles of the disclosure. In the drawings.

DETAILED DESCRIPTION

Figure 1:
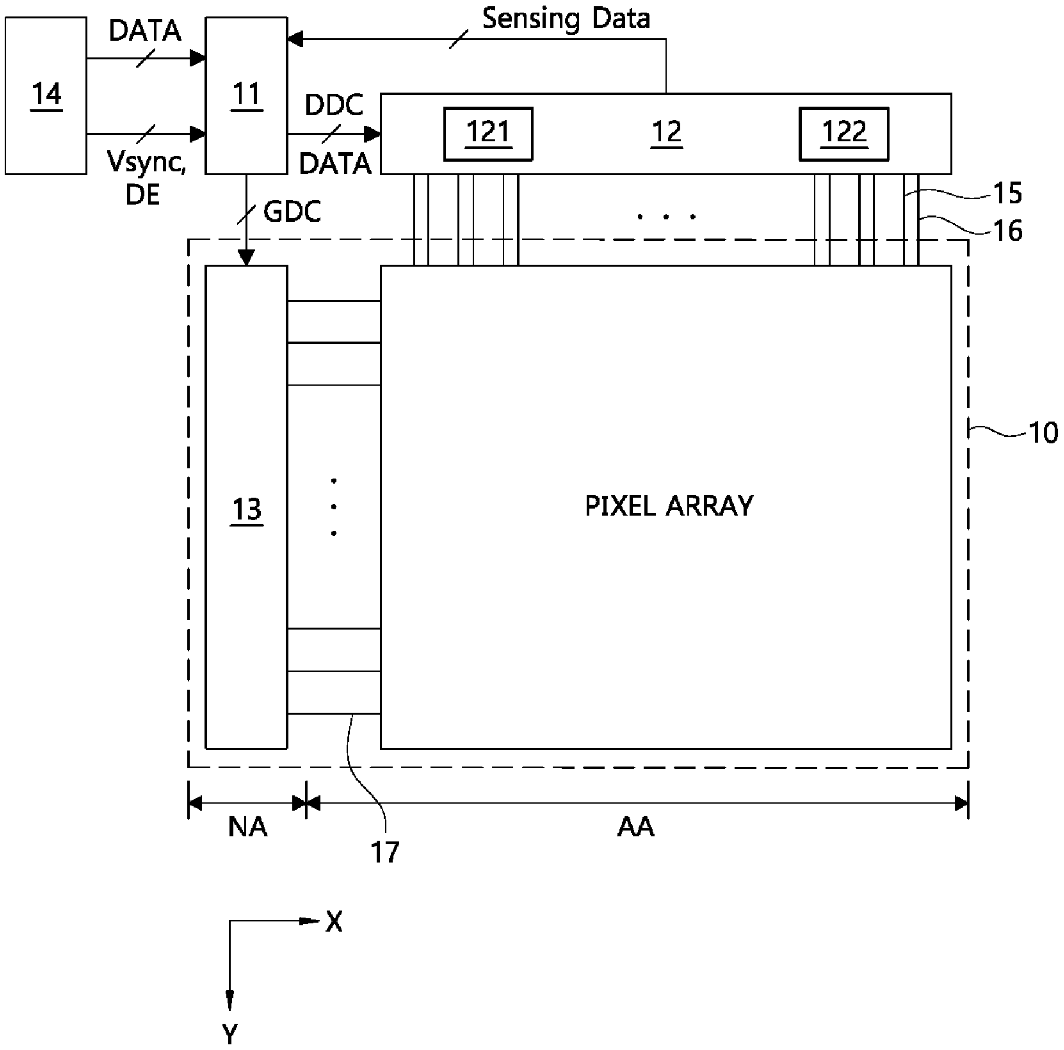
FIG. 1 is a diagram illustrating an electroluminescent display apparatus according to an embodiment of the present disclosure.

Advantages and features of the present disclosure, and implementation methods thereof will be clarified through the following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by the scope of the claims.

The shapes, sizes, ratios, angles, numbers and the like disclosed in the drawings for description of various embodiments of the present disclosure to describe embodiments of the present disclosure are merely exemplary and the present disclosure is not limited thereto. Like reference numerals refer to like elements throughout. Throughout this specification, the same elements are denoted by the same reference numerals. As used herein, the terms "comprise", "comprising", "have", "having,", "include", "including" and the like suggest that other parts can be added unless the term "only" is used. As used herein, the singular forms "a", "an", and "the" are intended to include the plural forms as well, unless context clearly indicates otherwise.

Elements in various embodiments of the present disclosure are to be interpreted as including margins of error even without explicit statements.

In describing a positional relationship, for example, when a position relation between two parts is described as "on~", "over~", "under~", and/or "next~", one or more other parts may be disposed between the two parts unless "just" or "direct" is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

Like reference numerals refer to like elements throughout.

In the specification, a gate driving circuit provided on a substrate of a display panel may be implemented with a thin film transistor (TFT) having an n-type metal oxide semiconductor field effect transistor (MOSFET) structure, but is not limited thereto and may be implemented with a TFT having a p-type MOSFET structure. A TFT may be a three-electrode element which includes a gate, a source, and a drain. The source may be an electrode which supplies a carrier to a transistor. In the TFT, the carrier may start to flow from the source. The drain may be an electrode which enables the carrier to flow out from the TFT. That is, in a MOSFET, the carrier flows from the source to the drain. In the n-type TFT (NMOS), the carrier is an electron, so a source voltage may have a lower voltage than a drain voltage so that the electron flows from the source to the drain. In the n-type TFT, because the electron flows from the source to the drain, a current may flow from the drain to the source. On the other hand, in the p-type TFT (PMOS), the carrier is a hole, so a source voltage may be higher than a drain voltage so that the hole flows from the source to the drain. In the p-type TFT, because the hole flows from the source to the drain, a current may flow from the source to the drain. It should be noted that a source and a drain of a MOSFET are not fixed but switch therebetween. For example, the source and the drain of the MOSFET may switch therebetween. Therefore, in describing embodiments of the present disclosure, one of a source and a drain will be described as a first electrode, and the other of the source and the drain will be described as a second electrode.

In the following description, when the detailed description of the relevant known function or configuration is determined to unnecessarily obscure the important point of the present disclosure, the detailed description will be omitted. Hereinafter, embodiments of the present disclosure will be described in detail with reference to the accompanying drawings.

Figure 2:
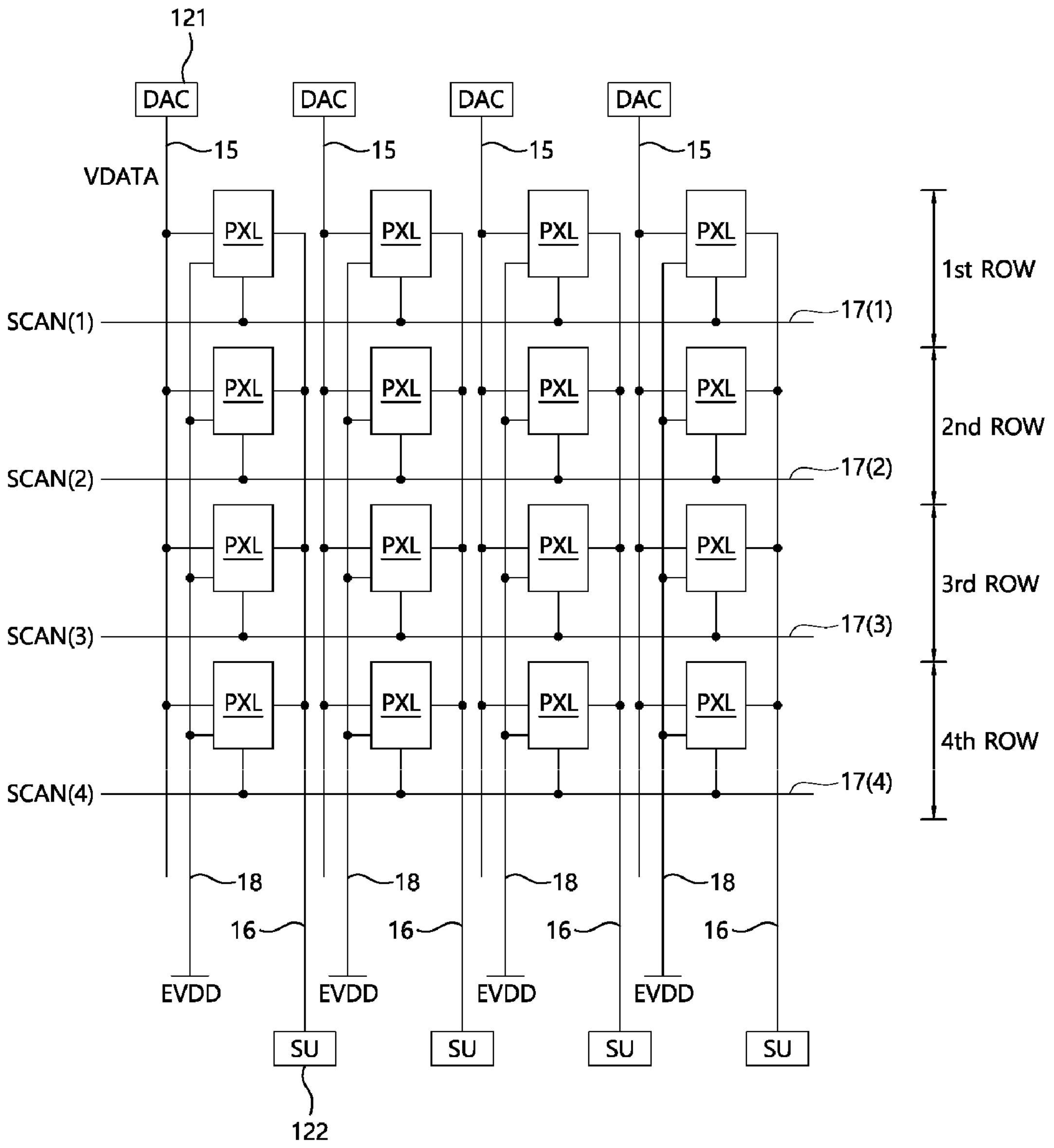
FIG. 2 is a diagram illustrating a pixel array included in the electroluminescent display apparatus of FIG. 1.
Figure 3:
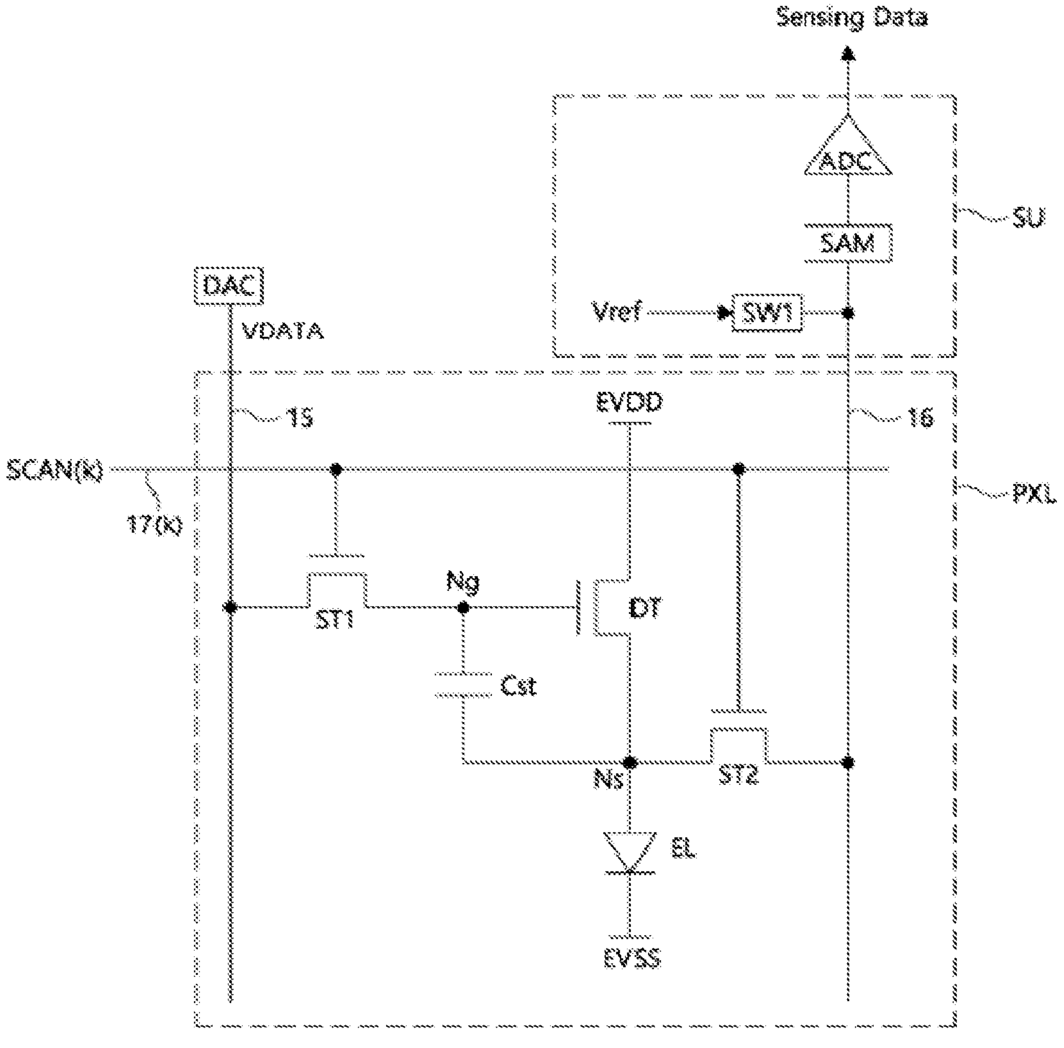
FIG. 3 is a diagram illustrating a pixel included in the pixel array of FIG. 2 and a sensing circuit connected thereto.

FIG. 1 is a diagram illustrating an electroluminescent display apparatus according to an embodiment of the present disclosure. FIG. 2 is a diagram illustrating a pixel array included in the electroluminescent display apparatus of FIG. 1. FIG. 3 is a diagram illustrating a pixel included in the pixel array of FIG. 2 and a sensing circuit connected thereto.

Referring to FIGS. 1 to 3, the electroluminescent display apparatus according to an embodiment of the present disclosure may include a display panel 10, a timing controller 11, a data driver 12, a gate driver 13, and a sensing circuit 122. In the present disclosure, a data voltage supply unit 121, the gate driver 12, and the sensing circuit 122 may implement a panel driving device. The data voltage supply unit 121 and the sensing circuit 122 may be embedded in an integrated circuit (IC) of the data driver 12.

The display panel 10 may include a plurality of data lines 15, a plurality of readout lines 16, and a plurality of gate lines 17. Also, a plurality of pixels PXL may be arranged in a plurality of intersection areas between the data lines 15, the readout lines 16, and the gate lines 17. A pixel array illustrated in FIG. 2 may include the plurality of pixels PXL arranged as a matrix type and may be provided in a display area AA of the display panel 10.

In the pixel array, pixel rows may be implemented with pixels PXL adjacent to one another in an extension direction (i.e., an X-axis direction) of the gate line 17 to the pixel array. Each of the pixel rows may include a plurality of pixels PXL adjacent to one another in the X-axis direction. Pixels PXL configuring the same pixel row may be connected to the same gate line 17 and may be connected to different data lines 15. Pixels PXL configuring the same pixel row may be connected to different readout lines 16, but are not limited thereto and a plurality of pixels PXL for implementing different colors may share one readout line 16.

In the pixel array, each pixel PXL may be connected to the data driver 12 through one of the data lines 15 and one of the readout lines 16 and may be connected to the gate driver 13 through one of the gate lines 17. Also, each pixel PXL may be connected to a high-level pixel power EVDD through a high-level power line 18.

In the pixel array, the pixels PXL may include pixels which implement a first color, pixels which implement a second color, and pixels which implement a third color, and moreover, may further include pixels which implement a fourth color. The first to fourth colors may selectively be one of red, green, blue, and white.

Each pixel PXL may be implemented as in FIG. 3, but is not limited thereto.

A pixel PXL arranged in a $k^{th}$ (where k is an integer) pixel row, as illustrated in FIG. 3, may include a light emitting device EL, a driving transistor DT, a storage capacitor Cst, a first switch transistor ST1, and a second switch transistor ST2, and the first switch transistor ST1 and the second switch transistor ST2 may be connected to the same gate line 17(*k*).

The light emitting device EL may emit light in response to a pixel current applied therethrough. The light emitting device EL may include an anode electrode connected to a source node Ns, a cathode electrode connected to a low-level pixel power EVSS, and an organic or inorganic compound layer disposed between the anode electrode and the cathode electrode. The organic or inorganic compound layer may include a hole injection layer (HIL), a hole transport layer (HTL), an emission layer (EML), an electron transport layer (ETL), and/or an electron Injection layer (EIL). When a voltage applied to the anode electrode is higher than a light emitting device EL operation point voltage compared to the low-level pixel power EVSS applied to the cathode electrode, the light emitting device EL may be turned on. When the light emitting device EL is turned on, a hole passing through the hole transport layer (HTL) and an electron passing through the electron transport layer (ETL) may move to the emission layer (EML) to generate an exciton, and thus, light may be emitted from the emission layer (EML).

The driving transistor DT may be a driving element. The driving transistor DT may generate a pixel current flowing in the light emitting device EL on the basis of a voltage difference between a gate node Ng and a source node Ns. The driving transistor DT may include a gate electrode connected to the gate node Ng, a first electrode connected to the high-level pixel power EVDD, and a second electrode connected to the source node Ns.

The storage capacitor Cst may be connected between the gate node Ng and the source node Ns and may store a gate-source voltage of the driving transistor DT.

The first switch transistor ST1 may electrically connect the data line 15 to the gate node Ng on the basis of (i.e. in response to the application of) a gate signal SCAN(k) and may apply a data voltage VDATA, charged into the data line 15, to the gate node Ng. The first switch transistor ST1 may include a gate electrode connected to a gate line 17(*k*), a first electrode connected to the data line 15, and a second electrode connected to the gate node Ng.

The second switch transistor ST2 may electrically connect the readout line 16 to the source node Ns on the basis of the gate signal SCAN(k) and may apply a voltage of the source node Ns to the readout line 16 on the basis of the pixel current, or may apply a reference voltage Vref, charged into the readout line 16, to the source node Ns. The second switch transistor ST2 may include a gate electrode connected to the gate line 17(*k*), a first electrode connected to the source node Ns, and a second electrode connected to the readout line 16.

Such a pixel structure may be merely an embodiment, and the inventive concept is not limited thereto. It should be noted that the claimed method may be applied to various pixel structures for sensing an electrical characteristic (a threshold voltage or electron mobility) of the driving transistor DT. For example, the claimed method may be applied to any pixel structure supplied with a data voltage, a gate signal, a sensing data voltage and a recovery data voltage. The timing controller 11 may be connected to a host system 14 through a first interface circuit and may be connected to the data driver 12 through a second interface circuit. The first interface circuit and the second interface circuit may be the same or differ.

The timing controller 11 may receive a vertical synchronization signal Vsync, a data enable signal DE, and input video data DATA from the host system 14 through the first interface circuit. The vertical synchronization signal Vsync is a control signal that defines one frame. The timing controller 11 may receive the input video data DATA in a vertical active period of each frame and may not receive the input video data DATA in a vertical blank period.

One frame may be defined by the vertical synchronization signal Vsync and the data enable signal DE, and moreover, a vertical active period and a vertical blank period of one frame may be defined. One frame may be defined as an adjacent pulse interval of the vertical synchronization signal Vsync. The vertical active period may be defined as a period in which the data enable signal DE of one frame is shifted between a logic high-level and a logic low-level. In some embodiments, the vertical active period may be defined as a period where the data enable signal DE of one frame is shifted from a logic low-level to a logic high-level. The vertical blank period may be defined as a period where the data enable signal DE of one frame is maintained at a logic low-level.

A length of the vertical blank period may vary based on the vertical synchronization signal Vsync and the data enable signal DE. The host system 14 may vary a length of the vertical blank period on the basis of the complexity of the input video data DATA and an inter-frame variation amount of the input video data DATA to vary a frame frequency in driving. When the input video data DATA is complicated and an inter-frame variation amount is large, the host system 14 may enlarge a length of the vertical blank period where each frame is provided, thereby lowering a frame frequency. When a length of the vertical blank period varies in one frame, a frame frequency and a temporal length of one frame may vary. This may be referred to as variable refresh rate (VRR) technology. The VRR technology may sufficiently secure a rendering time for graphics processing in the host system 14 to prevent a tearing phenomenon of an image, and thus, may provide a smoother image.

The host system 14 may be mounted on a system board. The host system 14 may include an input unit which receives a user command/data, a main power unit which generates a main power, a VRR control circuit which varies a frame frequency on the basis of an input image, and an output unit which outputs a transfer signal. The host system 14 may be implemented with an application processor, a personal computer (PC), a set-top box, or a graphics process unit, but is not limited thereto.

The timing controller 11 may control the panel driving device to display-drive the display panel 10, and thus, may reproduce an input image on the display panel 10. The timing controller 11 may control the panel driving device in the vertical blank period of one frame to sensing-drive the display panel 10, and then, may recovery-drive the display panel 10.

Sensing driving may be for sensing an electrical characteristic of the driving transistor DT included in the pixels PXL and may be simultaneously performed by one pixel row. In pixels PXL which are sensing-driven for enhancing the accuracy of sensing, light emitting devices may stop emission of light in sensing driving. The sensing driving may be sequentially or non-sequentially performed by one pixel row in a vertical blank period of each frame. Pixel rows other than the one pixel row sensing-driven in the vertical blank period of each frame may maintain a display state of a previous vertical active period.

Recovery driving may be for recovering an emission degree (luminance) of pixels PXL of a sensing pixel row to a display state which occurred immediately before the sensing driving. A recovery data voltage may be applied to the pixels PXL of the sensing pixel row, for the recovery driving. In some embodiments, based on control by the timing controller 11, the panel driving device may apply the recovery data voltage, having the same level as that of the display data voltage immediately before the sensing driving, to the pixels PXL of the sensing pixel row, and thus, corresponding pixels PXL may emit light again, thereby recovering luminance of the sensing pixel row to a state which occurred immediately before the sensing driving. In some embodiments, the panel driving device may generate the recovery data voltage configured by a combination of two display data voltages, and thus, may decrease a luminance deviation occurring between a sensed pixel row and a non-sensed pixel row. This will be described in detail with reference to FIGS. 4 to 11.

The timing controller 11 may generate a timing control signal of the panel driving device needed for the display driving, the sensing driving, and the recovery driving and may provide the timing control signal to the data driver 12 and the gate driver 13 through the second interface circuit. The timing control signal of the panel driving device may include a data timing control signal DDC for controlling an operation timing of the data driver 12 and a gate timing control signal GDC for controlling an operation timing of the gate driver 13.

The timing controller 11 may receive sensing result data based on the sensing driving from the data driver 12 through the second interface circuit. An electrical characteristic of the driving transistor DT included in each sensed pixel PXL may be reflected in the sensing result data. The timing controller 11 may calculate a pixel compensation value on the basis of the sensing result data and may apply the pixel compensation value to the input video data DATA received from the host system 14, thereby compensating for an electrical characteristic deviation of each driving transistor DT between pixels PXL. The pixel compensation value may be a correction based on the electrical characteristic of each driving transistor included in each sensed pixel PXL reflected in the sensing result data. The correction value may compensate for the electrical characteristic deviation of each driving transistor in each sensed pixel PXL, between the pixels PXL. The timing controller 11 may supply image data DATA, obtained through the correction based on the pixel compensation value, to the data driver 12 through the second interface circuit.

The timing controller 11 may control an operation of the panel driving device on the basis of the timing control signals GDC and DDC in a vertical active period of each frame, and thus, may implement the display driving. In the display driving, the panel driving device may supply all pixels PXL of the pixel array with the display data voltage for displaying an input image.

The timing controller 11 may also control an operation of the panel driving device on the basis of the timing control signals GDC and DDC in a vertical blank period of each frame, and thus, may also implement the sensing driving and the recovery driving. In the sensing driving, the panel driving device may supply pixels PXL of a sensing pixel row with the sensing data voltage needed for sensing. In the recovery driving, the panel driving device may supply the pixels PXL of the sensing pixel row with the recovery data voltage for recovering an original display state, and thus, an emission state of pixels PXL which stops during the sensing driving may be recovered by the recovery driving.

The gate driver 13 may be provided in a non-display area NA of the display panel 10 on the basis of a gate driver in panel (GIP) type. The gate driver 13 may generate a scan signal SCAN which swings between an on voltage and an off voltage, on the basis of the gate timing control signal GDC. The gate driver 13 may sequentially supply the scan signal SCAN to gate line 17(1) to 17(4) using line-by-line units in the vertical active period of each frame. The gate driver 13 may supply the scan signal SCAN to a gate line 17 connected to the pixels PXL of the sensing pixel row in the vertical blank period of each frame.

The data driver 12 may be implemented with a data IC. The data driver 12 may include a data voltage supply unit (DAC) 121, which generates a data voltage VDATA on the basis of the data timing control signal DDC, and a sensing circuit (SU) 122. The data voltage VDATA may be divided into a display data voltage, a sensing data voltage, and a recovery data voltage.

The data voltage supply unit (DAC) 121 may be connected to the pixel array through one of the data lines 15. The data voltage supply unit (DAC) 121 may generate the display data voltage having a level varying based on a gray level of the image data DATA in the vertical active period of each frame and may supply the display data voltage to the data line 15. The display data voltage may be supplied to the gate node Ng of the pixel PXL in synchronization with the scan signal SCAN. The data voltage supply unit (DAC) 121 may generate the sensing data voltage in the vertical blank period of each frame and may supply the sensing data voltage to the data line 15, and then, may generate the recovery data voltage and may supply the recovery data voltage to the data line 15. The sensing data voltage and the recovery data voltage may be supplied to the gate node Ng of a sensing target pixel PXL (that is, a pixel that is to be sensed) in synchronization with the scan signal SCAN.

The sensing circuit (SU) 122 may be connected to the pixel array through one of the readout lines 16. The sensing circuit (SU) 122 may sense, through the readout line 16, a pixel current flowing in the sensing target pixel PXL on the basis of the sensing data voltage or a source node voltage of the sensing target pixel PXL based on the pixel current. The pixel current may be an electrical characteristic of the sensing target pixel PXL and may vary based on the degree of degradation of the sensing target pixel PXL. The source node voltage may be (or be representative of) an electrical characteristic of the sensing target pixel PXL and may vary based on the degree of degradation (or degree of deviation from an expected characteristic) of the sensing target pixel PXL.

The sensing circuit (SU) 122 may be implemented as a voltage sensing type which samples the source node voltage, or may be implemented as a current sensing type which samples the pixel current.

A voltage sensing type sensing circuit (SU) 122, as in FIG. 3, may include a sampling circuit SAM and an analog-to-digital converter ADC. The sampling circuit SAM may directly sample a source node voltage of the sensing target pixel PXL stored in a parasitic capacitor of the readout line 16. The analog-to-digital converter ADC may convert an analog voltage, obtained through sampling by the sampling circuit SAM, into a digital sensing result value and may transfer the digital sensing result value to the timing controller 11.

A current sensing type sensing circuit (SU) 122 may include a current integrator, a sampling circuit, and an analog-to-digital converter. The current integrator may perform an integral on the pixel current flowing in the sensing target pixel PXL to output a sensing voltage. The sampling circuit may sample the sensing voltage which is output from the current integrator. The analog-to-digital converter may convert an analog voltage, obtained through sampling by the sampling circuit, into a digital sensing result value and may transfer the digital sensing result value to the timing controller 11.

In each of the display driving, the sensing driving, and the recovery driving, the sensing circuit (SU) 122 may turn on a first switch SW1 to apply the reference voltage Vref to the readout line 16, on the basis of a timing at which the data voltage VDATA is supplied to the data line 15. The reference voltage Vref charged into the readout line 16 may be supplied to the source node Ns of the pixel PXL in synchronization with the scan signal SCAN.

Figure 4:
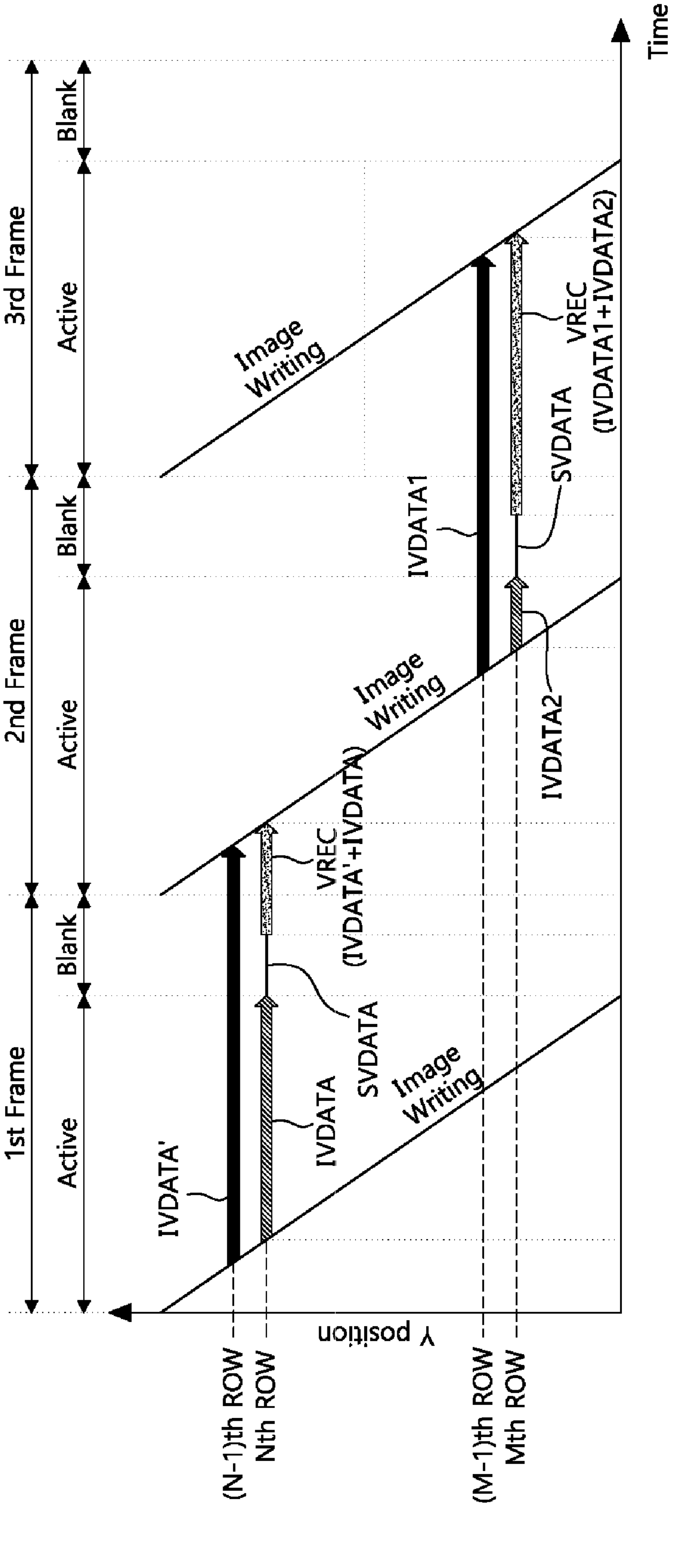
FIG. 4 is a diagram illustrating a driving concept for driving the pixel array of FIG. 2.

FIG. 4 is a diagram illustrating a driving concept for driving the pixel array of FIG. 2.

Referring to FIG. 4, each frame may include a vertical active period and a vertical blank period. The panel driving device may write display data voltage IVDATA', IVDATA, and IVDATA1, corresponding to image data, in all pixels while sequentially scanning all pixel rows of a pixel array in the vertical active period on the basis of control by the timing controller, and thus, may display-drive the display panel. The panel driving device may select a predetermined sensing pixel row (N, M) in a sensing period of the vertical blank period on the basis of control by the timing controller and may supply a sensing data voltage SVDATA to pixels of the sensing pixel row (N, M) to sensing-drive the display panel, and then, may supply a recovery data voltage VREC to the pixels of the sensing pixel row (N, M) in a recovery period of the vertical blank period to recovery-drive the display panel. The pixels of the sensing pixel row (N, M) may be turned on (emit light) based on the display driving, may be turned off (may not emit light) in the sensing driving, and may be turned on (emit light) based on the recovery driving. The pixels of the sensing pixel row (N, M) may be recovered to an image data display state immediately before sensing (i.e., the vertical active period) through the recovery driving.

For display recovery, the panel driving device may supply a display data voltage as the recovery data voltage VREC to the pixels of the sensing pixel row (N, M) on which sensing is completed.

In order to reduce a luminance deviation between a sensed pixel row and a non-sensed pixel row, the panel driving device may continuously supply a target pixel with a first display data voltage and a second display data voltage, each selected as the recovery data voltage VREC in the recovery period. Here, the target pixel may be a pixel on which sensing is completed, the first display data voltage may be a voltage which is supplied to a non-sensing pixel adjacent to the target pixel in a Y-axis direction, and the second display data voltage may be a voltage which is supplied to the target pixel.

For example, when a target pixel (a sensing pixel) is in an $N^{th}$ pixel row and a non-sensing pixel is in an $N-1^{th}$ pixel row in a first frame, the panel driving device may supply a display data voltage IVDATA' of the non-sensing pixel as the recovery data voltage VREC to the target pixel and may supply a display data voltage IVDATA of the target pixel as the recovery data voltage VREC to the target pixel, in the recovery period.

In the same method, when a target pixel (a sensing pixel) is in an $M^{th}$ pixel row and a non-sensing pixel is in an $M-1^{th}$ pixel row in a second frame, the panel driving device may supply a display data voltage IVDATA1 of the non-sensing pixel as the recovery data voltage VREC to the target pixel and may supply a display data voltage IVDATA2 of the target pixel as the recovery data voltage VREC to the target pixel, in the recovery period.

Figure 5:
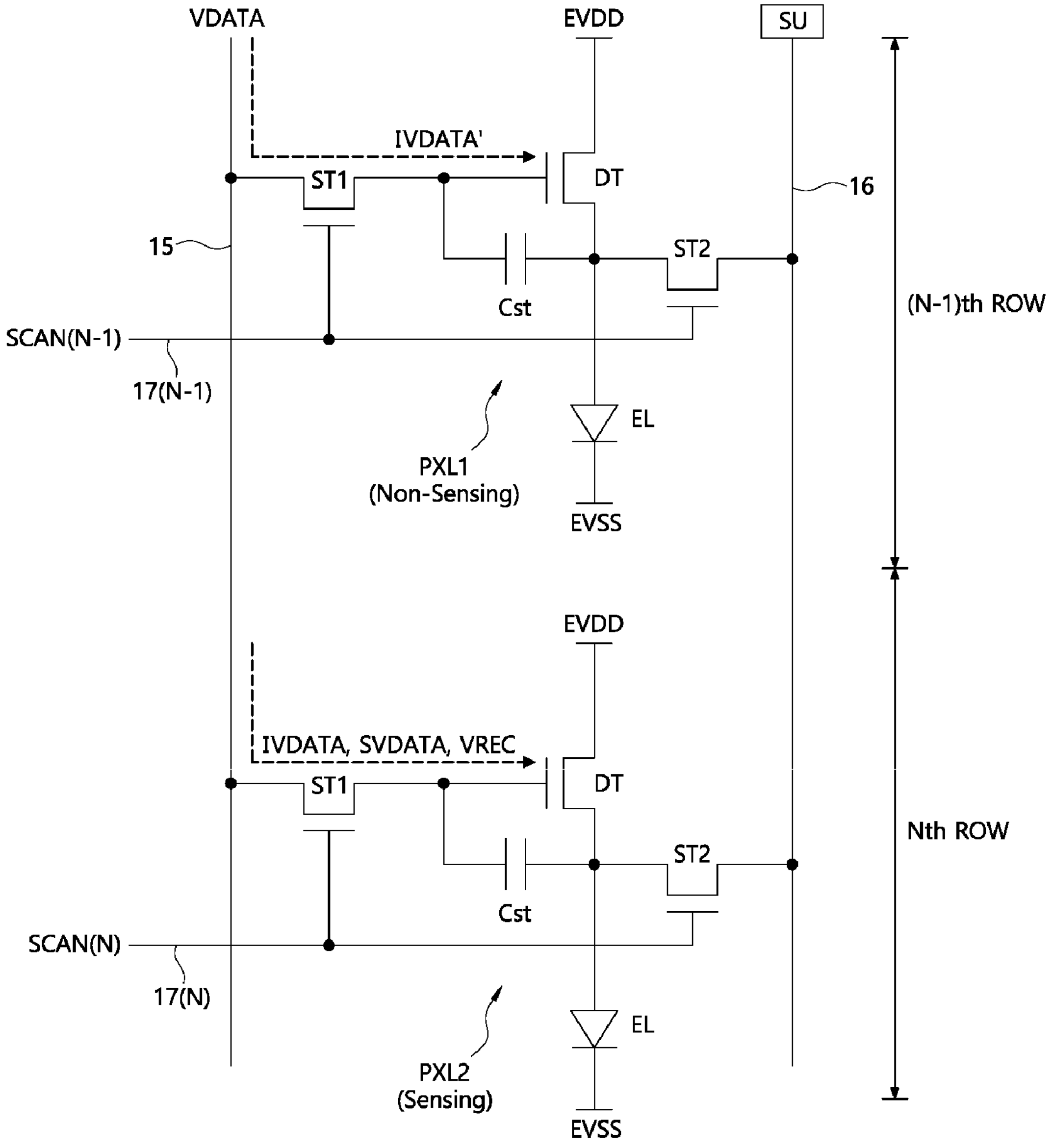
FIG. 5 is a diagram illustrating a connection configuration between a non-sensed first pixel and a sensed second pixel in the pixel array of FIG. 2.
Figure 6:
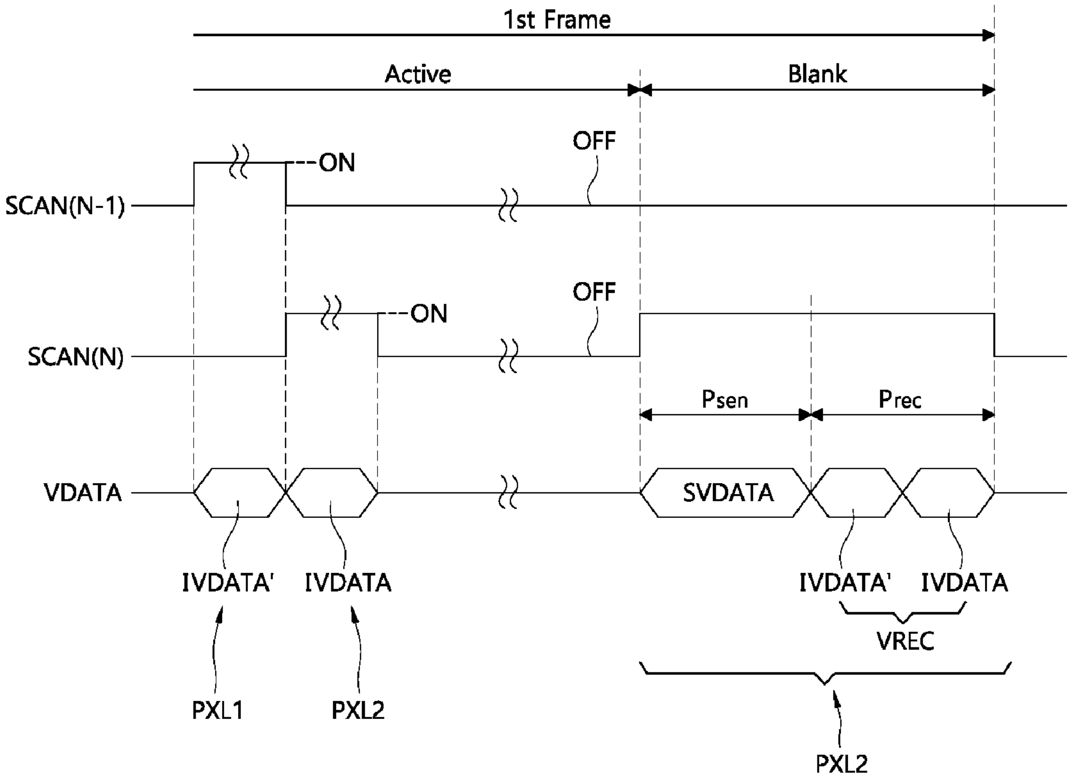
FIG. 6 is a diagram illustrating an embodiment of a driving timing of the first pixel and the second pixel of FIG. 5.

FIG. 5 is a diagram illustrating a connection configuration between a non-sensed first pixel PXL1 and a sensed second pixel PXL2 in the pixel array of FIG. 2. FIG. 6 is a diagram illustrating an embodiment of a driving timing of the first pixel PXL1 and the second pixel PXL2 of FIG. 5.

In FIG. 5, the first pixel PXL1 and the second pixel PXL2 may be arranged to be adjacent to each other in a Y-axis direction and may share a data line 15. The first pixel PXL1 may be disposed in an $N-1^{th}$ pixel row and may be supplied with an $N-1^{th}$ scan signal SCAN(N−1). The second pixel PXL2 may be disposed in an $N^{th}$ pixel row and may be supplied with an $N^{th}$ scan signal SCAN(N). The first pixel PXL1 may be a non-sensing pixel, and the second pixel PXL2 may be a sensing pixel.

In FIG. 6, an $N-1^{th}$ scan signal SCAN(N−1) may swing between an on voltage and an off voltage, and in the present embodiment, an $N-1^{th}$ scan signal SCAN(N−1) of an on voltage disposed in the vertical active period may be defined as a first gate signal. Also, an $N^{th}$ scan signal SCAN(N) may swing between the on voltage and the off voltage, and in the present embodiment, an $N^{th}$ scan signal SCAN(N) of an on voltage disposed in the vertical active period may be defined as a second gate signal and an $N^{th}$ scan signal SCAN(N) of an on voltage disposed in the vertical blank period may be defined as a third gate signal.

Referring to FIGS. 5 and 6, the data voltage supply unit may supply a first pixel PXL1 with a first data voltage IVDATA' corresponding to a first gate signal and may supply a second pixel PXL2 with a second data voltage IVDATA corresponding to a second gate signal in a vertical active period of a first frame and may continuously supply the second pixel PXL2 with a sensing data voltage SVDATA and a recovery data voltage VREC corresponding to a third gate signal in a vertical blank period of the first frame.

In other words, the data voltage supply unit may supply the first data voltage IVDATA' to the first pixel PXL1 through the data line 15 in an on period of the first gate signal included in the vertical active period and may supply the second data voltage IVDATA to the second pixel PXL2 through the data line 15 in an on period of the second gate signal included in the vertical active period. Also, the data voltage supply unit may continuously supply the second pixel PXL2 with the sensing data voltage SVDATA and the recovery data voltage VREC through the data line 15 in an on period of the third gate signal included in the vertical blank period.

Here, in the on period of the third gate signal included in the vertical blank period, the recovery data voltage VREC may be supplied to the second pixel PXL2 later than the sensing data voltage SVDATA. The vertical blank period may be temporally divided into a sensing period Psen and a recovery period Prec succeeding thereto. The sensing data voltage SVDATA may be supplied to the second pixel PXL2 in the sensing period Psen, and the recovery data voltage VREC may be supplied to the second pixel PXL2 in the recovery period Prec. The recovery data voltage VREC supplied to the second pixel PXL2 in the recovery period Prec may include the first data voltage IVDATA' and the second data voltage IVDATA.

The data voltage supply unit may sequentially supply the first data voltage IVDATA' and the second data voltage IVDATA to the second pixel PXL2 in the recovery period Prec included in the vertical blank period. In the recovery period Prec, the first data voltage IVDATA' may be supplied to the second pixel PXL2, and then, the second data voltage IVDATA may be supplied to the second pixel PXL2, whereby a luminance deviation of an image implemented in an N−1$^{th}$ pixel row and an N$^{th}$ pixel row may be reduced.

The sensing circuit may sense an electrical characteristic of the second pixel PXL2 on the basis of the sensing data voltage SVDATA in the sensing period Psen of the vertical blank period.

The gate driver may generate the first gate signal, the second gate signal, and the third gate signal. An on period of the first gate signal may be earlier than an on period of the second gate signal, and the on period of the second gate signal may be earlier than an on period of the third gate signal. The gate driver may supply the first gate signal having a first phase to the first pixel PXL1 through a first gate line arranged in the N−1$^{th}$ pixel row and may supply the second gate signal having a second phase and the third gate signal having a third phase to the second pixel PXL2 through a second gate line which is adjacent to the first gate line and is arranged in the N$^{th}$ pixel row. Here, the first phase may be earlier than the second phase, and the second phase may be earlier than the third phase.

Figure 7:
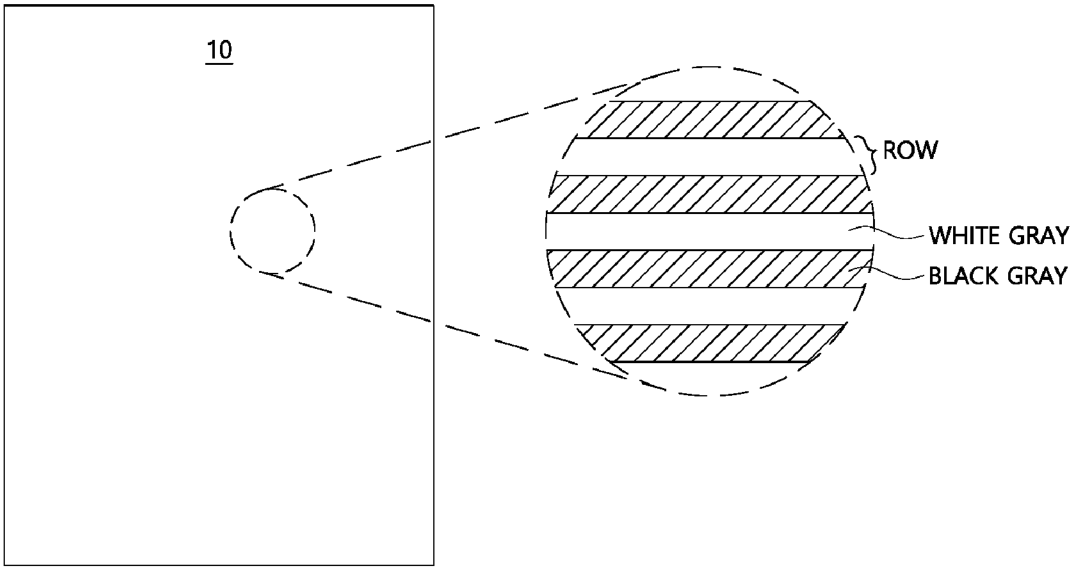
FIG. 7 is a diagram illustrating a one-by-one image pattern where a voltage difference between a first data voltage supplied to a first pixel and a second data voltage supplied to a second pixel is large, in a vertical active period of a first frame of FIG. 6.
Figure 8:
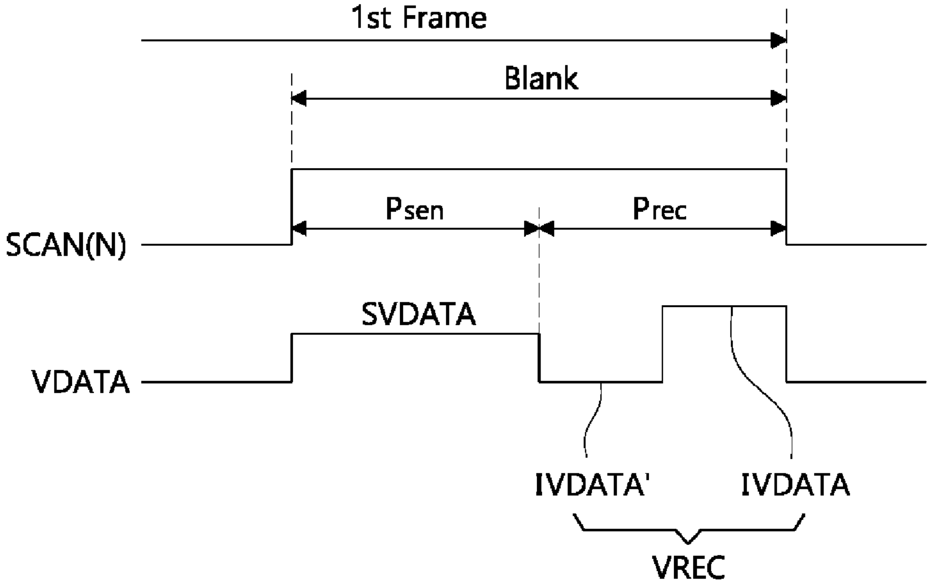
FIG. 8 is a diagram illustrating a recovery data voltage and a sensing data voltage supplied to a second pixel in a vertical blank period of the first frame when the one-by-one image pattern illustrated in FIG. 7 is displayed, in the first frame of FIG. 6.

FIG. 7 is a diagram illustrating a one-by-one image pattern where a voltage difference between a first data voltage IVDATA' supplied to a first pixel PXL1 and a second data voltage IVDATA supplied to a second pixel PXL2 is large, in the vertical active period of the first frame of FIG. 6. FIG. 8 is a diagram illustrating the recovery data voltage and the sensing data voltage supplied to the second pixel PXL2 in the vertical blank period of the first frame when the one-by-one image pattern illustrated in FIG. 7 is displayed, in the first frame of FIG. 6.

In the one-by-one image pattern of FIG. 7, the first data voltage IVDATA' may represent a black gray level, and the second data voltage IVDATA may represent a white gray level. A one-by-one image pattern may be understood to mean a pattern in which darker (e.g. black) grayscale data and lighter (e.g. white) grayscale data are applied alternately to adjacent rows of pixels.

As in FIG. 8, when a recovery data voltage VREC (i.e., the first data voltage IVDATA') and the second data voltage IVDATA are sequentially supplied to the second pixel PXL2 in a recovery period Prec of a vertical blank period while the one-by-one image pattern is displayed in a first frame, a charging voltage waveform of a data line 15 associated with a display operation of the second pixel PXL2 may be the same as a charging voltage waveform of the data line 15 associated with a recovery operation of the second pixel PXL2 in the first frame. The charging voltage waveform may be described as an amount of change in voltage charged, or a voltage waveform. In detail, the second data voltage IVDATA having a white gray level may be supplied to the second pixel PXL2, for display driving of the second pixel PXL2, and thus, the data line 15 may be charged from the first data voltage IVDATA' having a previous black gray level to the second data voltage IVDATA having a white gray level. The first data voltage IVDATA' having a black gray level and the second data voltage IVDATA having a white gray level may be continuously supplied to the second pixel PXL2, for recovery driving of the second pixel PXL2, and thus, the data line 15 may be charged from the first data voltage IVDATA' having a previous black gray level to the second data voltage IVDATA having a white gray level. When a charging voltage waveform of the data line 15 associated with the display operation of the second pixel PXL2 is the same as a charging voltage waveform of the data line 15 associated with the recovery operation of the second pixel PXL2, a luminance deviation between pixel rows caused by a charging voltage waveform difference may be reduced.

Furthermore, in an electroluminescent display apparatus to which VRR technology is applied, when a recovery data voltage is configured by a combination of two display data voltages, an effect of reducing a luminance deviation may be even greater. This is because a length of a vertical blank period, and in this case, a recovery period, may increase when a frame frequency increases. The greater the length of the recovery period, the more effective the application of two display data voltages in reducing the luminance deviation.

Figure 9:
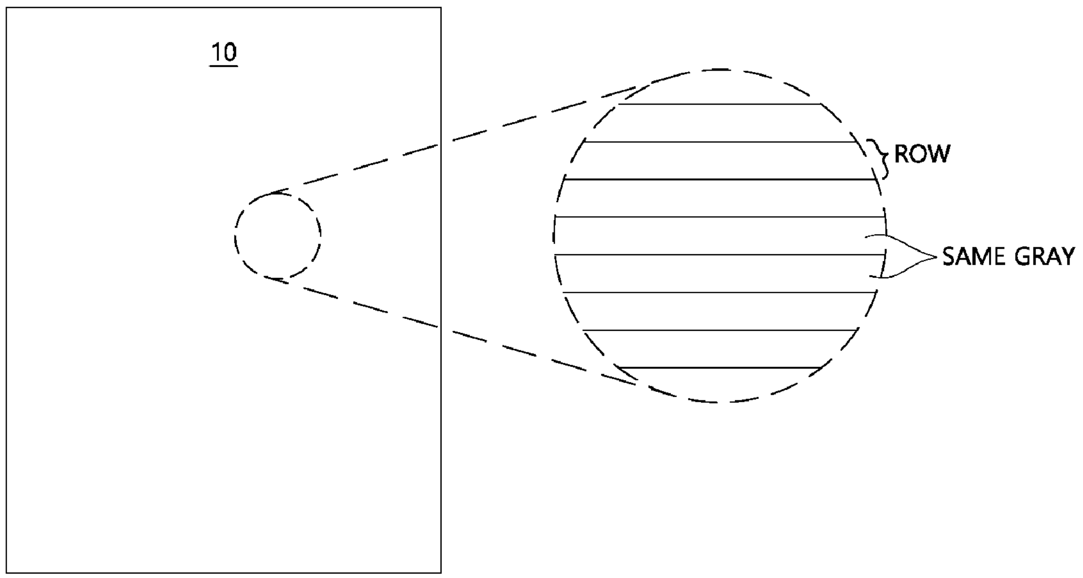
FIG. 9 is a diagram illustrating a solid image pattern where there is no voltage difference between a first data voltage supplied to a first pixel and a second data voltage supplied to a second pixel, in the vertical blank period of the first frame of FIG. 6.
Figure 10:
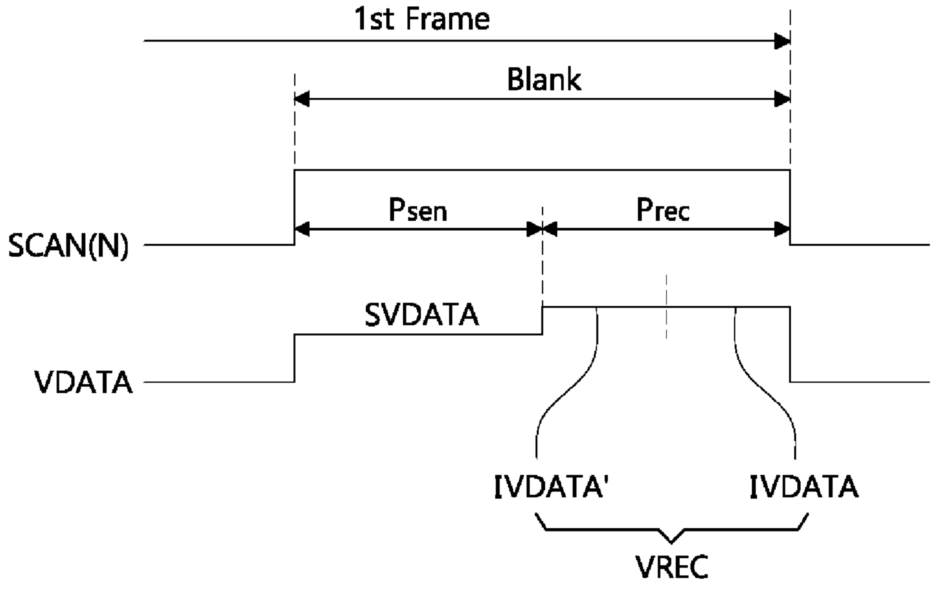
FIG. 10 is a diagram illustrating a recovery data voltage and a sensing data voltage supplied to a second pixel in the vertical blank period of the first frame when the solid image pattern illustrated in FIG. 9 is displayed, in the first frame of FIG. 6.

FIG. 9 is a diagram illustrating a solid image pattern where there is no voltage difference between a first data voltage IVDATA' supplied to a first pixel and a second data voltage IVDATA supplied to a second pixel, in the vertical blank period of the first frame of FIG. 6. FIG. 10 is a diagram illustrating a recovery data voltage and a sensing data voltage supplied to a second pixel in the vertical blank period of the first frame when the solid image pattern illustrated in FIG. 9 is displayed, in the first frame of FIG. 6.

In the solid image pattern of FIG. 9, the first data voltage IVDATA' and the second data voltage IVDATA may represent the same certain gray level.

As in FIG. 10, when a recovery data voltage VREC (i.e., the first data voltage IVDATA') and the second data voltage IVDATA are sequentially supplied to a second pixel PXL2 in a recovery period Prec of a vertical blank period while the solid image pattern is displayed in a first frame, a charging voltage waveform of a data line 15 associated with a display operation of the second pixel PXL2 may be the same as a charging voltage waveform of the data line 15 associated with a recovery operation of the second pixel PXL2 in the first frame, and thus, a luminance deviation between pixel rows caused by a charging voltage waveform difference may be reduced.

Figure 11:
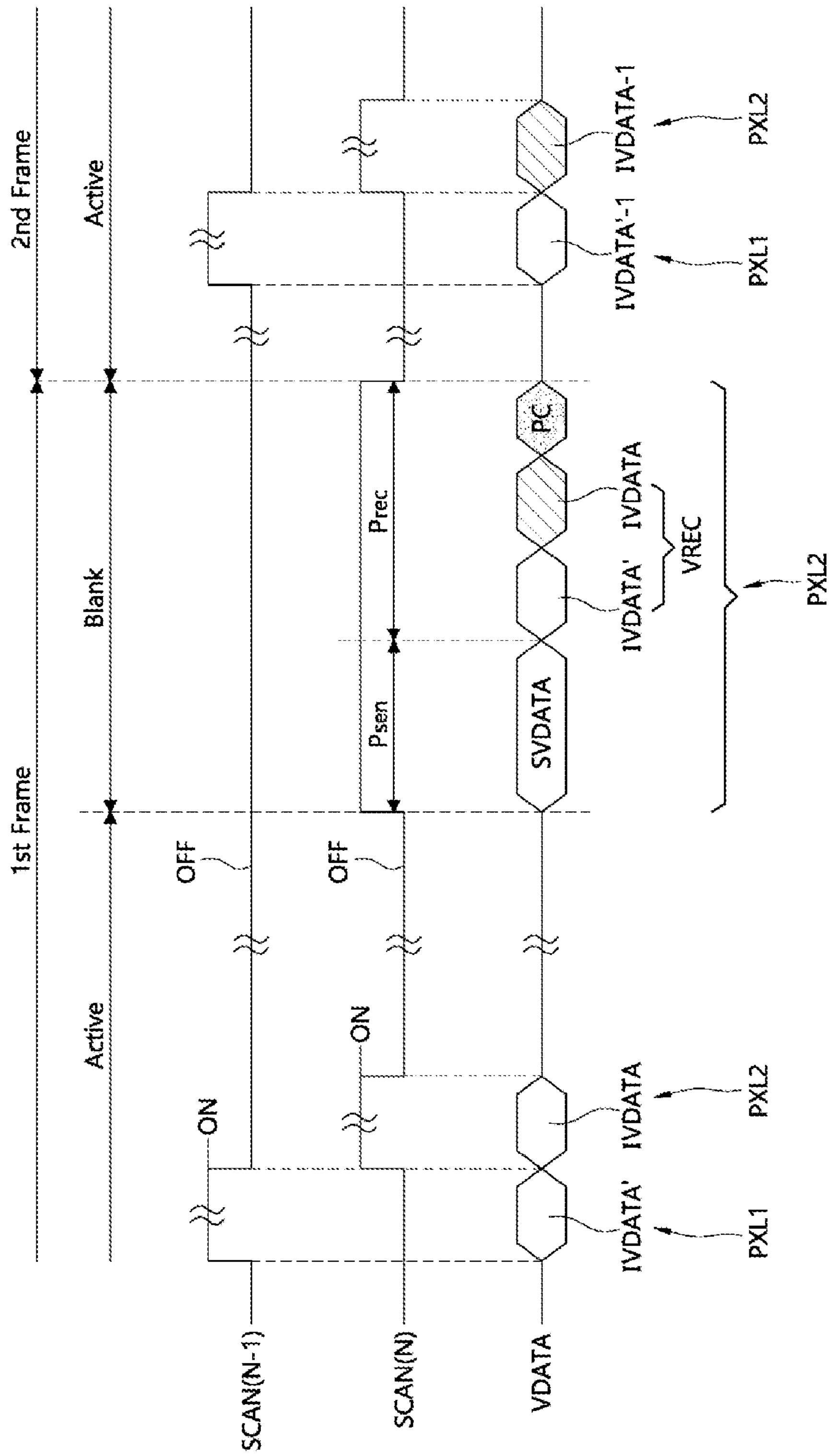
FIG. 11 is a diagram illustrating another embodiment of a driving timing of the first pixel and the second pixel of FIG. 5.

FIG. 11 is a diagram illustrating another embodiment of a driving timing of the first pixel and the second pixel of FIG. 5.

In FIG. 11, an N−1$^{th}$ scan signal SCAN(N−1) may swing between an on voltage and an off voltage, and in the present embodiment, an N−1$^{th}$ scan signal SCAN(N−1) of an on voltage disposed in a vertical active period of a first frame may be defined as a first gate signal. Also, an $N^{th}$ scan signal SCAN(N) may swing between the on voltage and the off voltage, and in the present embodiment, an $N^{th}$ scan signal SCAN(N) of an on voltage disposed in a vertical active period of the first frame may be defined as a second gate signal and an $N^{th}$ scan signal SCAN(N) of an on voltage disposed in the vertical blank period of the first frame may be defined as a third gate signal. Also, in the present embodiment, an $N^{th}$ scan signal SCAN(N) of an on voltage disposed in a vertical active period of a second frame may be defined as a fourth gate signal.

Referring to FIGS. 5 and 11, the data voltage supply unit may supply a first pixel PXL1 with a first data voltage IVDATA' corresponding to a first gate signal SCAN(N−1) and may supply a second pixel PXL2 with a second data voltage IVDATA corresponding to a second gate signal SCAN(N) in a vertical active period of a first frame, continuously supply the second pixel PXL2 with a sensing data voltage SVDATA and a recovery data voltage VREC corresponding to a third gate signal in a vertical blank period of the first frame, and supply the second pixel PXL2 with a fourth data voltage IVDATA-1 corresponding to a fourth gate signal in a vertical active period of a second frame subsequent to the first frame.

In other words, the data voltage supply unit may supply the first data voltage IVDATA' to the first pixel PXL1 through the data line 15 in an on period of the first gate signal included in the vertical active period of the first frame and may supply the second data voltage IVDATA to the second pixel PXL2 through the data line 15 in an on period of the second gate signal included in the vertical active period of the first frame. The data voltage supply unit may continuously supply the second pixel PXL2 with the sensing data voltage SVDATA and the recovery data voltage VREC through the data line 15 in an on period of the third gate signal included in the vertical blank period of the first frame. Also, the data voltage supply unit may supply the second pixel PXL2 with the fourth data voltage IVDATA-1 through the data line 15 in an on period of the fourth gate signal included in the vertical active period of the second frame subsequent to the first frame.

The sensing data voltage SVDATA may be supplied to the second pixel PXL2 in the sensing period Psen, and the recovery data voltage VREC may be supplied to the second pixel PXL2 in the recovery period Prec. The recovery data voltage VREC supplied to the second pixel PXL2 in the recovery period Prec may include the first data voltage IVDATA', the second data voltage IVDATA, and a pre-charge voltage PC.

The data voltage supply unit may sequentially supply the first data voltage IVDATA', the second data voltage IVDATA, and the pre-charge voltage PC to the second pixel PXL2 in the recovery period Prec included in the vertical blank period. In the recovery period Prec, the first data voltage IVDATA' may be supplied to the second pixel PXL2, and then, the second data voltage IVDATA may be supplied to the second pixel PXL2, whereby a luminance deviation of an image implemented in an $N-1^{th}$ pixel row and an $N^{th}$ pixel row may be reduced.

The pre-charge voltage PC may be supplied to the second pixel PXL2 after the second data voltage IVDATA is supplied, in the recovery period Prec. The pre-charge voltage PC may be for increasing a speed in which the fourth data voltage IVDATA-1 is charged into the second pixel PXL2 in the vertical active period of the second frame. To this end, the pre-charge voltage PC may be an average voltage between the second data voltage IVDATA and the fourth data voltage IVDATA-1.

The sensing circuit may sense an electrical characteristic of the second pixel PXL2 on the basis of the sensing data voltage SVDATA in the sensing period Psen of the vertical blank period.

The gate driver may generate the first gate signal, the second gate signal, the third gate signal, and the fourth gate signal. An on period of the first gate signal may be earlier than an on period of the second gate signal, and the on period of the second gate signal may be earlier than an on period of the third gate signal. Also, the on period of the third gate signal may be earlier than an on period of the fourth gate signal. The gate driver may supply the first gate signal having a first phase (the term “phase” when used herein may be understood to mean ‘timing’ or ‘on-period’) to the first pixel PXL1 through a first gate line arranged in the $N-1^{th}$ pixel row and may supply the second gate signal having a second phase and the third gate signal having a third phase to the second pixel PXL2 through a second gate line which is adjacent to the first gate line and is arranged in the $N^{th}$ pixel row. Here, the first phase may be earlier than the second phase, the second phase may be earlier than the third phase, and the third phase may be earlier than the fourth phase.

Furthermore, the gate driver may generate a fifth gate signal having a fifth phase which is later than the third phase and earlier than the fourth phase, in the second frame, and may further supply the fifth gate signal to the first pixel PXL1 through the first gate line. The fifth gate signal may be an $N-1^{th}$ scan signal SCAN(N−1) of an on voltage disposed in the vertical active period of the second frame.

The fourth gate signal, the fourth data voltage IVDATA-1 synchronized with the fourth gate signal, the fifth gate signal, and the fifth data voltage IVDATA'-1 synchronized with the fifth gate signal may respectively be signals for display-driving the second pixel PXL2 and the first pixel PXL1 in the second frame. That is, the fifth data voltage can be described as a data voltage applied to the first pixel PXL1 in the second active frame and fourth data voltage can be described as a data voltage applied to the second pixel PXL2 in the second active frame.

In the present embodiment, a recovery data voltage supplied to a sensing pixel in a vertical blank period of each frame may be configured by a combination of two display data voltages. The two display data voltages may include a first data voltage which is supplied to an adjacent pixel in a vertical active period of each frame and a second data voltage which is supplied to a sensing pixel. The adjacent pixel (i.e. the pixel adjacent to the sensing pixel) may share a data line with the sensing pixel and may be scanned prior to the sensing pixel.

Therefore, in the present embodiment, a charging voltage waveform of a data line associated with a display operation of a sensing pixel may be the same as a charging voltage waveform of the data line associated with a recovery operation of the sensing pixel in each frame, and thus, a luminance deviation between pixel rows caused by a charging voltage waveform difference may be reduced.

Moreover, according to the present embodiment, an effect of reducing a luminance deviation may be obtained because a recovery data voltage is configured by a combination of two display data voltages and may further increase in electroluminescent display apparatuses based on VRR technology.

The effects according to the present disclosure are not limited to the above examples, and other various effects may be included in the specification.

It will be apparent to those skilled in the art that various modifications and variations can be made in the panel driving device, the driving method thereof, and the electroluminescent display apparatus of the present disclosure without departing from the technical idea or scope of the disclosure. Thus, it is intended that the present disclosure cover the modifications and variations of this disclosure provided they come within the scope of the appended claims and their equivalents.

What is claimed is:

1. An electroluminescent display apparatus, comprising:

a display panel configured to include a first pixel and a second pixel that share a same data line and are sequentially scanned;

a data voltage supply circuit configured to supply the first pixel with a first data voltage corresponding to a first gate signal and supply the second pixel with a second data voltage corresponding to a second gate signal in a vertical active period of a first frame and continuously supply the second pixel with a sensing data voltage and a recovery data voltage corresponding to a third gate signal in a vertical blank period of the first frame; and a sensing circuit configured to sense an electrical characteristic of the second pixel on the basis of the sensing data voltage in the vertical blank period of the first frame, wherein the recovery data voltage is for being supplied to the second pixel later than the sensing data voltage in the vertical blank period of the first frame, and wherein a level of the recovery data voltage for being supplied to the second pixel is to change from the first data voltage and to the second data voltage in the vertical blank period of the first frame.

2. The electroluminescent display apparatus of claim 1, wherein, in a recovery period included in the vertical blank period of the first frame, the first data voltage and the second data voltage are for being sequentially supplied to the second pixel.

3. The electroluminescent display apparatus of claim 1, wherein, in a recovery period included in the vertical blank period of the first frame, the first data voltage is for being supplied to the second pixel, and then, the second data voltage is for being supplied to the second pixel.

4. The electroluminescent display apparatus of claim 1, further comprising a gate driver configured to generate the first gate signal, the second gate signal, and the third gate signal, wherein the gate driver is configured to supply the first gate signal having a first phase to the first pixel through a first gate line and supply the second gate signal having a second phase and the third gate signal having a third phase to the second pixel through a second gate line adjacent to the first gate line, wherein the first phase is earlier than the second phase, and wherein the second phase is earlier than the third phase.

5. The electroluminescent display apparatus of claim 1, wherein the data voltage supply circuit is configured to:

supply the first data voltage to the first pixel through the data line in an on period of the first gate signal included in the vertical active period of the first frame;

supply the second data voltage to the second pixel through the data line in an on period of the second gate signal included in the vertical active period of the first frame; and continuously supply the second pixel with the sensing data voltage and the recovery data voltage through the data line in an on period of the third gate signal included in the vertical blank period of the first frame, and wherein the on period of the first gate signal is earlier than the on period of the second gate signal, and the on period of the second gate signal is earlier than the on period of the third gate signal.

6. The electroluminescent display apparatus of claim 1, wherein the data voltage supply circuit is further configured to supply the second pixel with a fourth data voltage corresponding to a fourth gate signal in a vertical active period of a second frame subsequent to the first frame, and the recovery data voltage for being supplied to the second pixel in the vertical blank period of the first frame further comprises a pre-charge voltage for increasing a speed in which the fourth data voltage is charged into the second pixel in the vertical active period of the second frame, and wherein the level of the recovery data voltage for being supplied to the second pixel is to further change from the second data voltage to the pre-charge voltage in the vertical blank period of the first frame.

7. The electroluminescent display apparatus of claim 6, wherein the pre-charge voltage is an average voltage between the second data voltage and the fourth data voltage.

8. A panel driving device, comprising:

a data voltage supply circuit configured to supply a first pixel of a display panel with a first data voltage corresponding to a first gate signal and supply a second pixel of the display panel with a second data voltage corresponding to a second gate signal in a vertical active period of a first frame and continuously supply the second pixel with a sensing data voltage and a recovery data voltage corresponding to a third gate signal in a vertical blank period of the first frame, the first pixel and the second pixel sharing a same data line and being sequentially scanned; and a sensing circuit configured to sense an electrical characteristic of the second pixel on the basis of the sensing data voltage in the vertical blank period of the first frame, wherein the recovery data voltage is for being supplied to the second pixel later than the sensing data voltage in an on period of the third gate signal included in the vertical blank period of the first frame, and wherein a level of the recovery data voltage for being supplied to the second pixel is to change from the first data voltage to the second data voltage in the vertical blank period of the first frame.

9. The panel driving device of claim 8, wherein, in a recovery period included in the vertical blank period of the first frame, the first data voltage and the second data voltage are for being sequentially supplied to the second pixel.

10. The panel driving device of claim 8, wherein, in a recovery period included in the vertical blank period of the first frame, the first data voltage is for being supplied to the second pixel, and then, the second data voltage is for being supplied to the second pixel.

11. The panel driving device of claim 8, further comprising a gate driver configured to generate the first gate signal, the second gate signal, and the third gate signal, wherein the gate driver is configured to supply the first gate signal having a first phase to the first pixel through a first gate line and supply the second gate signal having a second phase and the third gate signal having a third phase to the second pixel through a second gate line adjacent to the first gate line, wherein the first phase is earlier than the second phase, and wherein the second phase is earlier than the third phase.

12. The panel driving device of claim 8, wherein the data voltage supply circuit is configured to:

supply the first data voltage to the first pixel through the data line in an on period of the first gate signal included in the vertical active period of the first frame;

supply the second data voltage to the second pixel through the data line in an on period of the second gate signal included in the vertical active period of the first frame; and continuously supply the second pixel with the sensing data voltage and the recovery data voltage through the data line in an on period of the third gate signal included in the vertical blank period of the first frame, and wherein the on period of the first gate signal is earlier than the on period of the second gate signal, and the on period of the second gate signal is earlier than the on period of the third gate signal.

13. The panel driving device of claim 8, wherein the data voltage supply circuit is further configured to supply the second pixel with a fourth data voltage corresponding to a fourth gate signal in a vertical active period of a second frame subsequent to the first frame, and the recovery data voltage for being supplied to the second pixel in the vertical blank period of the first frame further comprises a pre-charge voltage for increasing a speed in which the fourth data voltage is charged into the second pixel in the vertical active period of the second frame, and wherein the level of the recovery data voltage for being supplied to the second pixel is to further change from the second data voltage to the pre-charge voltage in the vertical blank period of the first frame.

14. The panel driving device of claim 13, wherein the pre-charge voltage is an average voltage between the second data voltage and the fourth data voltage.

15. A panel driving method, comprising:

supplying a first pixel of a display panel with a first data voltage corresponding to a first gate signal and supplying a second pixel of the display panel with a second data voltage corresponding to a second gate signal in a vertical active period of a first frame;

supplying the second pixel with a sensing data voltage corresponding to a third gate signal and sensing an electrical characteristic of the second pixel on the basis of the sensing data voltage in a vertical blank period of the first frame; and supplying the second pixel with a recovery data voltage corresponding to a third gate signal in a vertical blank period of the first frame, wherein the recovery data voltage is supplied to the second pixel later than the sensing data voltage in an on period of the third gate signal included in the vertical blank period of the first frame, wherein the first pixel and the second pixel share a same data line and is sequentially scanned, and wherein a level of the recovery data voltage supplied to the second pixel changes from the first data voltage to the second data voltage in the vertical blank period of the first frame.

16. The panel driving method of claim 15, wherein, in a recovery period included in the vertical blank period of the first frame, the first data voltage and the second data voltage are sequentially supplied to the second pixel.

17. The panel driving method of claim 15, wherein, in a recovery period included in the vertical blank period of the first frame, the first data voltage is supplied to the second pixel, and then, the second data voltage is supplied to the second pixel.

* * * * *